United States Patent [19]

Nunes

[11] 4,159,572

[45] Jul. 3, 1979

[54] DYNAMIC GAGE AVERAGING AND LENGTH DETERMINING DEVICE AND METHOD FOR CONTINUOUS SHEET MATERIAL

[75] Inventor: James A. Nunes, Martinez, Calif.

[73] Assignee: United States Steel Corporation, Pittsburgh, Pa.

[21] Appl. No.: 847,880

[22] Filed: Nov. 2, 1977

[51] Int. Cl.² .......................... G01B 7/04; B21B 37/02
[52] U.S. Cl. .................................. 33/142; 33/141 B; 72/9; 242/57
[58] Field of Search .................. 33/142, 141 B, 147 L, 33/129; 242/55, 36, 57; 72/8, 9, 17

[56] References Cited

U.S. PATENT DOCUMENTS 3,553,992  1/1971  Harbaugh ............................. 242/57

Primary Examiner—Richard R. Stearns
Attorney, Agent, or Firm—William A. Danchuk

[57] ABSTRACT

Method and apparatus for dynamically determining average gage of continuous sheet material passing about a work roll for subsequent winding or coiling upon a take-up reel. The apparatus includes pulse tachometers for both the work roll, of known diameter, as well as the take-up reel. A comparison of the angular velocity of both the work roll and take-up reel results in a precise velocity ratio for a given period of time. The ratio, when taken in conjunction with the revolutions of the take-up reel, is then used within a digital logic apparatus for determining the change in coil diameter for the given time period, thereby resulting in the average gage of the continuous sheet material wound upon the take-up reel for that given time period. Strip length may also be calculated by the same apparatus.

11 Claims, 2 Drawing Figures

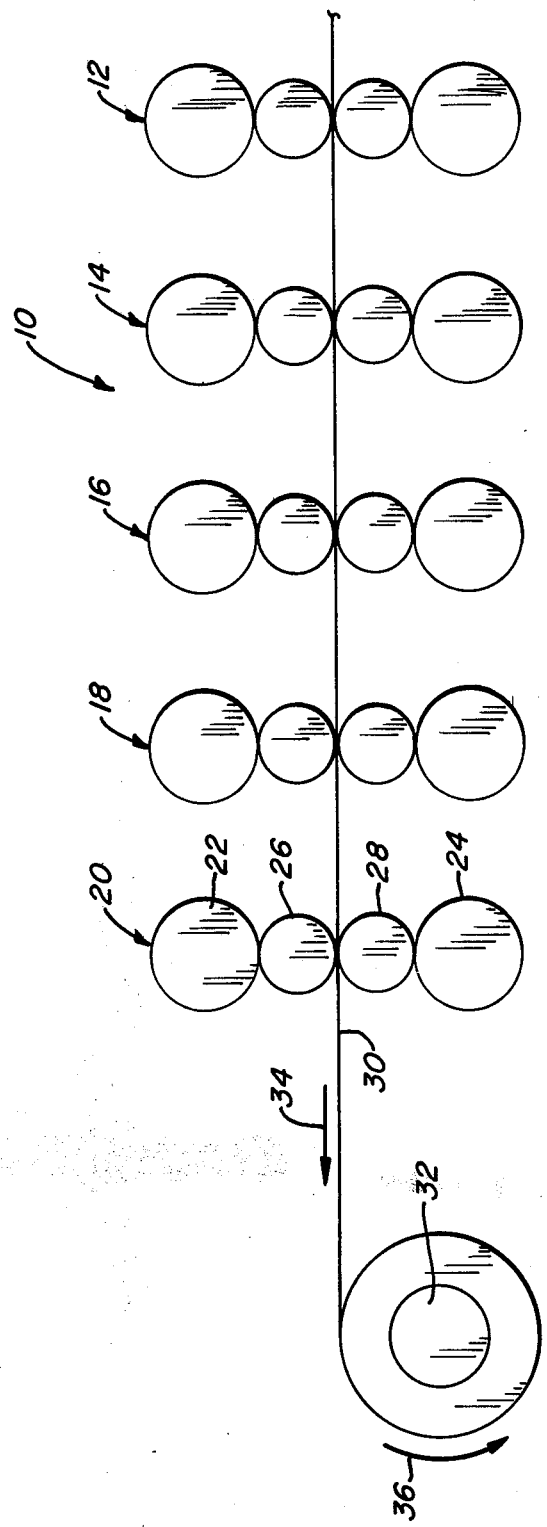

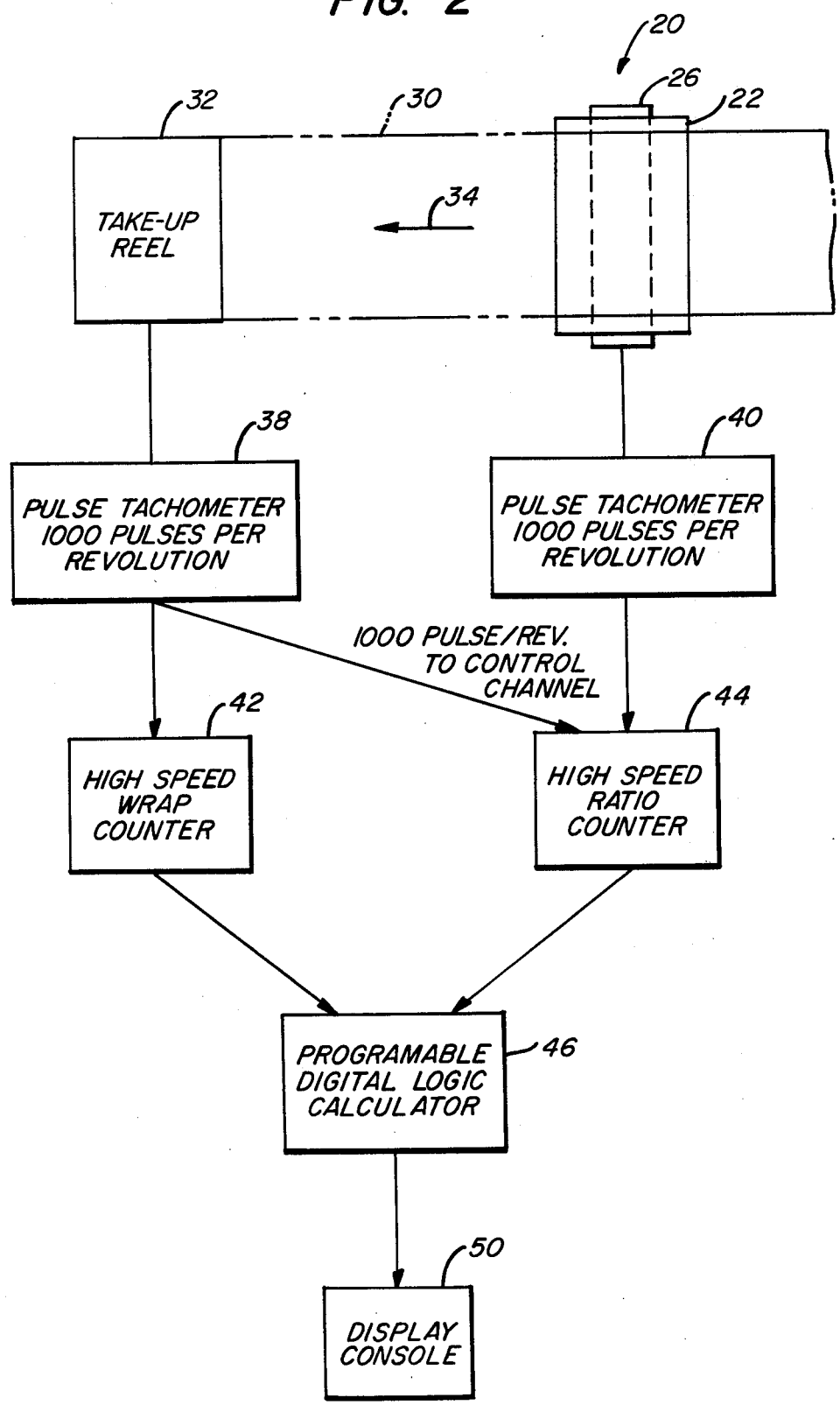

DYNAMIC GAGE AVERAGING AND LENGTH DETERMINING DEVICE AND METHOD FOR CONTINUOUS SHEET MATERIAL

BACKGROUND OF THE INVENTION

The area of cold mill production has, for some time, required on-line gaging equipment that responds quickly and gives accurate results. This requirement has been heightened recently by attempts at cost reduction and economic cold mill production programs. Steel producers have found one area (cold mill production) in which "extra" give-aways to the customer can be alleviated or merely reduced, resulting in surprising cost reduction and increased mill production efficiency. These "give-aways", which are basically extra product sent to the customer in order to insure he gets at least what he has ordered, are predicated upon an uncertainty in footage of product or product weight and/or product gage. If the mill operator could find a more exact way of determining these parameters, there could be a reduction in the amount of steel product with confidence that the customer will not be "short-changed".

Since the first gaging devices were installed within cold reduction mills to the present sophisticated radiation absorption devices (such as X-rays and Accuray gages) on-line instantaneous gaging has been desired. Operating experience has shown, however, that the new equipment, like the old equipment, can be subject to gross and costly errors due to instrument drift and equipment malfunctioning. In response to this basic defect, some method of checking average product gage has been necessary. Current practice in this regard continues to be the "Wrap Check Average Gage Method".

The present "Wrap Check Average Gage Method" of checking the accuracy of the on-line cold mill gaging equipment is accomplished manually on solely a random basis. This task is performed by inserting markers into the side wall of a coil being rolled with a known number of wraps between the markers. After the coil has been completely rolled, the distance between the markers is measured and divided by the number of wraps between the markers. This method, while cumbersome, is accurate if care is taken in inserting the markers, measuring the distance therebetween, and calculating the end result. This method, however, does have major disadvantages, i.e. (1) gage results are not available until the coil being "tested" has been completely rolled; (2) the results obtained represent only the average gage for that portion of the coil lying between the two markers inserted in the coil; (3) the results can be no better than the measurements taken to calculate the average gage—the factor of human error; and (4) the method is extremely hazardous to the operator inasmuch as he must open the safety enclosure surrounding the moving coil to insert the markers.

It should be apparent that the present manual calculation method leaves much to be desired. Additionally, there would appear to be some degree of dissatisfaction with the modern expensive gaging systems which are subject to drift and slippage errors. The present dynamic gage-averaging method and apparatus is a successful attempt to fill this void.

SUMMARY OF THE INVENTION

The present invention is addressed to an on-line dynamic gage averaging device which gives an acurate and incremental average gage of the sheet material throughout the entire length of a coil during processing. The apparatus does not require operator assistance, calibration or the changing of ranges regardless of the gage being produced.

The underlying basis of the present method and apparatus is the "stopping" of the recoiling action for an instant in time to permit the automatic measurement of the coil diameter. While this is not physically possible, it may be accomplished in effect by looking at the instantaneous velocity ratio between the work roll and the take-up reel or mandrel. This, of course, presumes that the angular velocities of the work roll and the take-up reel may be accurately measured. By using pulse tachometers, one for each reel, this can easily be accomplished. Once the instantaneous velocity ratio has been derived for a given time instant, it is multiplied by the work roll diameter (which had been previously factored into a digital logic apparatus) to yield the instantaneous diameter of the coil on the take-up reel for that given instant of time. This process may be repeated, and is repeated constantly, for any number of "instants of time". As a result, the average gage may be calculated continuously for the sheet material existing any two coil diameters between any two given time instants.

To achieve the continuous gage averaging ability just discussed, two pulse tachometers, two high speed counters, and a programmable digital logic apparatus are employed. One each of the pulse tachometers (1000 pulses per revolution) and counters are associated with the work roll and take-up reel. The pulses coming from the work roll are counted for a period of time equal to 1,000 pulses received by the take-up reel counter or one revolution of the take-up reel. This process in effect divides the pulses counted from the work roll by 1,000 for each revolution of the take-up reel and provides the ratio between the work roll velocity and the take-up reel for that instant of time. By reading a ratio counter and wrap counter simultaneously, a starting and stopping pair of data points are acquired. These data points are employed to calculate the change in the coil diameter between the stopping point and the starting point. The number of wraps between these diameters is then made by subtracting the first wrap count from the second wrap count. As a result, all of the required information necessary for calculating average sheet material gage is acquired while the coil remains in a dynamic or rotating state.

It is therefore a primary object and feature of the present invention to provide a method and apparatus for calculating the average gage of a continuous strip of sheet material for a given time period while the strip is constantly moving.

It is a general object and feature of the present invention to provide a dynamic gage averaging device and method which provides a continuous gage readout for a moving strip of continuous sheet material and which also provides precise footage counter as an adjunct thereto.

It is another general object and feature of the present invention to provide a dynamic gage averaging and footage determining method and apparatus which provides a continuous readout for a moving strip of continuous sheet material and which provides for the cancellation of errors due to slippage and the like of the work roll with respect to the moving sheet material.

It is yet another object and feature of the present invention to provide an inexpensive and easily maintained dynamic gage averaging and footage counting device and method for calculating both gage and footage of a continuously moving strip of sheet material.

Other objects and features of the invention will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularity in the appended claims. The invention itself, however, both as to its structure and its operation together with the additional objects and advantages thereof will best be understood from the following description of the preferred embodiment of the invention when read in conjunction with the accompanying drawings wherein:

FIG. 1 is a schematic view of a portion of a cold mill with which the present invention is associated; and FIG. 2 is a schematic flow diagram of the present invention and its interfacing with the cold mill of FIG. 1.

DETAILED DESCRIPTION OF THE INVENTION

Referring to FIG. 1, there is shown a schematic representation of a five-stand cold reduction mill 10. The cold reduction mill 10 generally includes a first stand 12, a second stand 14, a third stand 16, a fourth stand 18 and a final or fifth stand 20. Each of the individual stands, for example stand 20, is composed of an upper back-up roll 22, a lower back-up roll 24, a first work roll 26 and a second work roll 28. As indicated in FIG. 1, the strip 30 to be cold reduced is passed between each of the sets of work rolls, each performing another step in the reduction of the strip to its finally gaged size just before it is wound upon a take-up reel or mandrel 32. The strip 30 is moved through the five-stand cold mill 10 in a direction indicated by arrow 34 and is wound upon the take-up reel or mandrel 32 in the direction of the arrow 36.

Each of the five stands 12, 14, 16, 18 and 20 has an associated on-line gage which is an indication of the separation of the work rolls in each of the five stands. As noted previously, these gages, for the most part, are relatively accurate but are subject to drift and error thereby resulting in off-gage products. Inasmuch as the customer requires specific gage tolerances, any sheet material produced must be within the tolerances set or is considered off-gage and non-acceptable. Therefore, even if the gages associated with each of the five stands indicates a specific gage being produced by that stand, there is the distinct possibility for some reason that the gage actually being produced by that stand is different from the gage indication. In order to preclude the complete running of off-gage product on a relatively long coil, and in order to provide an independent check of the gage of the product being produced, an independent on-line dynamic gage averaging apparatus and method according to the present invention is provided.

Looking to FIG. 2, there is shown a schematic flow diagram indicating the individual elements of the apparatus and the steps to be performed in the practice of the method according to the present invention. Associated with the take-up reel 32 and the last stand work roll 26 are two pulse tachometers 38 and 40, respectively. The pulse tachometers 38 and 40 have an out-put of 1,000 pulses per revolution of the associated roll. Consequently, during one full revolution of the take-up reel or the work roll, its associated pulse tachometer will produce an out-put of 1,000 pules. A high speed wrap counter 42 is operative to receive the in-put from pulse tachometer 38 and to count the number of 1,000 pulses and translate that information into the number of full revolutions or wraps of the take-up reel. A high speed ratio counter 44 is associated with the pulse tachometer 40. The high speed ratio counter 44 is operative to receive the pulse out-put of the pulse tachometer 40 as well as the pulse out-put of the pulse tachometer 38. The pulse coming from the work roll pulse tachometer are counted for a period of time equal to 1,000 pulses into the in-put channel of the ratio counter. Simultaneously, the ratio counter is operative to count the number of pulses from the tachometer 40 during the period of time it takes to receive the 1,000 pulses into the control channel of the ratio counter. This in effect divides the pulses counted from the work roll by 1,000 for each revolution of the take-up reel and provides the necessary ratio between the work roll velocity and the take-up reel velocity for that instant of time. By reading the ratio counter and wrap counter simultaneously, a starting and stopping pair of data points are acquired. These data pairs are fed directly into a programmable digital logic counter 46 which performs the necessary mathematical calculations for determining the diameter difference between the stopping and starting points. The programmable calculator 46 also functions to calculate the number of wraps between these two diameters by subtracting the first wrap count from the second wrap count. With this information in-put into the calculator 46, all of the necessary parameters to calculate average gage are present.

The digital logic apparatus employed within the present invention may be any one of a variety of commonly available types and serves to accumulate the necessary parameter in-puts (from the counter primarily) for the calculation of dynamic average gage and strip length. The calculator then makes the appropriate mathematical comparisons for subsequent print-out as gage and length as well as total coil weight and outside diameter. All of these read-outs are not only desirable, but necessary for the proper manufacture of each coil by the producer as well as identification by the customer.

Any number of different calculators, both simple and complex can be used for the above-noted calculations. These range from the "desk-top" calculator to the sophisticated microprocessor, the latter being the type of calculator employed in the preferred embodiment of the present invention. Whatever the specific apparatus used, there remain several given formulas which must be solved for each instant of time that such calculations are made. As previously noted, the high speed ratio counter 44 is operative to provide an out-put signal to the programmable digital logic calculator which, in ratio form, reflects the relative angular velocities of the take-up reel 32 to the work roll 26. It is this ratio R which, when taken in conjunction with the known work roll diameter $D_W$, provides the diameter of the coil on the take-up reel at the instant of time such ratio is obtained. Specifically, $$R(\text{ratio}) \times D_W = D_C (\text{diameter of coil on take-up reel at time.})$$

The diameter of the coil $D_C$ accordingly can be read continuously any number of times during the coiling of the strip product. By taking two coil diameters, (a starting diameter $D_S$ and a stopping diameter $D_E$) the average gage of the product therebetween may be determined according to the following formula:

$$\bar{G}(\text{average gage}) = (D_E - D_S/2N)$$

where N is the number of wraps of coil within the two diameters. One side benefit of the data in-put to the microprocessor 46 is that the length of the strip lying within the two diameters may be calculated as follows:

$$L(\text{length}) = (\pi/24)N(D_S + D_E),$$

or $$L = 0.1309 N(D_S + D_E).$$

If reliable signals are provided which can be used to accurately indicate these "starting" and "stopping" diameters, the error in footage measurement, for instance, is less than ±0.1%.

The necessity for acquiring a constant read-out of average gage, coil length, coil weight and diameter, to be displayed on a display console 50, associated with the microprocessor 46, is achieved in the following manner: The two pulse tachometers begin their 1,000 pulse per revolution out-puts at the commencement of the sheet material being wound upon the take-up reel 32. Both the high speed wrap counter 42 as well as the high speed ratio counter 44 begin counting wraps and the angular velocity ratio, respectively, at the start of coil winding. The digital logic calculator or microprocessor 46 is adapted to receive the out-put signals from the two counters immediately. However, for purposes of minimizing errors and getting the system "on track", the first eight wraps, while counted, are discounted for the most part in any precise calculation of subsequent average gage. Average gage is made from any given number of wraps which is constantly updated as coiling progresses. For instance, in the preferred embodiment of the present invention, the gage sampling is done for a given number equal to fifty (50) wraps. In effect, any read-out of gage average on the display console 50 is based upon this sampling of fifty wraps which is constantly updated with each new wrap added to the coil. As each new wrap is added, for gage average sampling purposes, the "first" wrap is dropped. Accordingly, a "new" sampling of a different fifty wraps is made constantly with each additional wrap made to the coil. This procedure serves two very specific purposes. Specifically, errors in slippage of the sheet material about the work roll are minimized because of the large sampling number. Any slippage (within reason, of course) in the work roll-sheet material interface is infinitesimal considering the large gage sample constantly being considered. Additionally, the use of a large sampling which is constantly updated provides a very accurate average gaging system which is insulated from other possible errors such as timing, etc. which might affect other less tolerant and less accurate systems. In short, the procedure just outlined is tolerant of small errors which would cause very detrimental errors in other gage averaging apparatus and methods.

The dynamic gage averaging apparatus and method of the present invention provides an inexpensive and most easily maintained system for accurately computing the average gage (and footage) of a continuous sheet product to be wound upon a take-up reel while the product is being wound. The current system is independent of the other mill gaging equipment and provides a constant and accurate check on this equipment. The present system not only does not require calibration, but eliminates the current safety hazards associated with present calculation methods. In conclusion, the present on-line dynamic gage averaging device is an accurate and continuous way of obtaining average gage and coil length as the coil is being wound. By using this information correctly, the amount of off-gage produce being produced may be drastically reduced, thereby alleviating the expensive and wasteful production of product not within the tolerances required by the customer.

While certain changes may be made in the above-noted method and apparatus, without departing from the scope of the invention herein involved, it is intended that all matter contained in the above description, or shown in the accompanying drawings, shall be interpreted as illustrative and not in a limiting sense.

I claim:

1. A dynamic gage averaging apparatus for use in conjunction with continuous sheet material passing about a first rotatable roller of a known diameter to be subsequently wound upon a take-up reel, said gage averaging apparatus including:
   means for measuring take-up reel angular velocity;
   means for measuring the first roller angular velocity, said first roller's angular velocity being equal to the linear velocity of the sheet material being passed thereabout;
   means for comparing the first roller velocity to the take-up reel velocity to determine a ratio therebetween for a given time period;
   means for measuring number of revolutions of the take-up reel for said given time period; and
   means for automatically factoring the change in diameter of the coil on the take-up reel for said given time period by twice the number of revolutions of the take-up reel for obtaining the average gage of the product wound upon the take-up reel during said given period of time.

2. A dynamic gage averaging apparatus for use in conjunction with a continuous sheet product passing about a rotatable roller of known diameter to be subsequently wound upon a take-up reel, said gage averaging apparatus comprising:
   first tachometer means for producing a first set of electrical pulses having a frequency proportional to the angular velocity of such rotatable roller;
   second tachometer means for producing a second set of electrical pulses having a frequency proportional to the angular velocity of such take-up reel;
   first counter means associated with said first tachometer means for counting the number of pulses therefrom for a given time period;
   second counter means associated with said second tachometer means for counting the number of pulses therefrom for said given time period, said second counter means being capable of determining the total number of revolutions of such take-up reel for said given time period; and
   digital calculator means adapted to receive signals from said first and second counter means for determining a relative velocity ratio between such rotatable roller and such take-up reel for said given time period thereby determining the change in diameter of such sheet material upon such take-up reel during said given time period and the average gage of such sheet product for said given time period.

3. The dynamic gage averaging apparatus according to claim 2 wherein said digital calculator means resets both said first and second counter means after said given period of time while both the take-up reel and the rotatable roller are rotating but before another pulse occurs in either said first or second tachometer means.

4. The dynamic gage averaging apparatus according to claim 2 wherein said digital calculator means includes means for automatically comparing each revolution of such rotatable roller during such a period for automatically determining the coil diameter of the sheet material upon the take-up reel during such period, said digital calculator also including means for resetting said counter associated with such take-up reel after each whole revolution for providing a continuous read-out of average gage and sheet length for a revolution of such take-up reel or any fractional portion of a revolution of such take-up reel.

5. The dynamic gage averaging apparatus according to claim 2 wherein said digital calculator means is operative to determine the average gage of the sheet material being wound upon the take-up reel for a given period of time by multiplying said velocity ratio by the known diameter of the rotatable roller to determine the change in coil diameter between a first given time and then again at a second given time and dividing by twice the number of wraps on the coil between said first and second given times.

6. The dynamic gage averaging apparatus according to claim 2 wherein said digital calculator means is operative to determine the amount of sheet material wound upon the take-up reel for a given time period by adding the diameter of the coil at the start of the time period to the diameter of the coil at the end of the time period and multiplying by the number of wraps of sheet material upon the take-up reel for said given time period and a constant equal to $\pi/24$.

7. The dynamic gage averaging apparatus according to claim 2 wherein said digital calculator means is operative to provide a continuous average gage read-out to a display unit, said calculator means being operative to calculate the average gage of sheet material being wound upon the take-up reel for a sampling of a given number of wraps, said sampling of said given number of wraps being constantly updated as progressive wraps are made to the coil.

8. The dynamic gage averaging apparatus according to claim 7 wherein said digital calculator means is operative to calculate the average gage of a sampling of fifty wraps of sheet material on such take-up reel, said sampling being constantly updated during coiling for each new wrap, the sampling remaining at fifty wraps.

9. Method of calculating the average gage of continuous sheet material while it is being wound upon a take-up reel and while it is passed about a work roll of known diameter, said method comprising:
 measuring the angular velocity of the take-up reel for a given period of time;
 measuring the angular velocity of the work roll for a given period of time, the angular velocity of the work roll being equal to the linear velocity of the sheet material as the latter is passed thereabout;
 comparing the angular velocity of the work roll to the angular velocity of the take-up reel for determining a velocity ratio therebetween for said given period of time;
 measuring the number of revolutions of the take-up reel for said given period of time for determining the number of wraps of sheet material laid upon itself during said given time period; and
 relating the change in diameter of the coil upon the take-up reel during said given time period for obtaining the average gage of the product wound upon the take-up reel during said given time period.

10. The method of calculating average gage of continuous sheet material according to claim 9 further including the step of resetting the angular velocity measuring instruments after each whole revolution of the take-up reel and coil thereupon for providing a continuous read-out of average gage for each whole revolution of the take-up reel or any fractional portion thereof.

11. Method for calculating length of continuous sheet material while it is being wound upon a take-up reel and while it is passed about a work roll of known diameter, said method comprising:
 measuring the angular velocity of the take-up reel for a given period of time;
 measuring the angular velocity of the work roll for a given period of time, the angular velocity of the work roll being equal to the linear velocity of the sheet material as the latter is passed thereabout;
 comparing the angular velocity of the work roll to the angular velocity of the take-up reel for determining a velocity ratio therebetween for said given period of time;
 measuring the number of revolutions of the take-up reel for said given period of time for determining the number of wraps of sheet material laid upon itself during said given time period;
 automatically determining the coil diameter at the start of the given time period;
 automatically determining the coil diameter at the end of the given time period; and
 automatically multiplying the number of wraps of sheet material upon the take-up reel made during said given time period and by a constant of $\pi/24$.

* * * * *